United States Patent
Ai et al.

(10) Patent No.: US 12,158,419 B2
(45) Date of Patent: Dec. 3, 2024

(54) GAS DETECTION TUNING MODULATION

(71) Applicant: QLM Technology Ltd., Newport (GB)

(72) Inventors: Xiao Ai, Bristol (GB); James Titchener, Bristol (GB)

(73) Assignee: QLM Technology Limited (GB)

( * ) Notice: Subject to any disclaimer, the term of this patent is extended or adjusted under 35 U.S.C. 154(b) by 385 days.

(21) Appl. No.: 17/659,763

(22) Filed: Apr. 19, 2022

(65) Prior Publication Data

US 2022/0390365 A1     Dec. 8, 2022

Related U.S. Application Data

(60) Provisional application No. 63/202,376, filed on Jun. 8, 2021.

(30) Foreign Application Priority Data

Nov. 12, 2021 (GB) ..................... 2116372

(51) Int. Cl.
  *G01N 21/39*      (2006.01)
(52) U.S. Cl.
  CPC ....... *G01N 21/39* (2013.01); *G01N 2021/392* (2013.01); *G01N 2021/399* (2013.01)
(58) Field of Classification Search
  CPC ............. G01N 21/39; G01N 2021/392; G01N 2021/399; G01N 21/3504; G01S 7/4802; G01S 17/95
  USPC ....................................................... 356/437
  See application file for complete search history.

(56) References Cited

U.S. PATENT DOCUMENTS 5,339,155 A * 8/1994 Partridge ........... G01N 21/3504
                                                         356/419
8,605,262 B2    12/2013 Campbell et al.

FOREIGN PATENT DOCUMENTS

GB           2586075         2/2022

OTHER PUBLICATIONS

International Search Report and Written Opinion, PCT/GB2022/050706, 11 pgs Jun. 24, 2022.
Perez-Serrano et al., "Atmospheric CO2 remote sensing system based on high brightness semiconductor lasers and single photon counting detection," Proceedings of SPIE, IEEE, US, vol. 9645, 10 pgs. Oct. 20, 2015.
Nagasawa et al., "Random modulation cw lidar using new random sequence," Applied Optics, vol. 29, No. 10, 5 pgs. Apr. 1, 1990.

* cited by examiner

*Primary Examiner* — Md M Rahman
(74) *Attorney, Agent, or Firm* — Gerald W. Roberts

(57) ABSTRACT

A method of gas detection comprises emitting radiation of different wavelengths across the absorption spectrum of a gas towards a target area; and analysing the spectrum of returned laser light from the target area to identify the gas in the target area using the time correlation of the emitted radiation and the returning radiation. The radiation is modulated using respective orthogonal modulation codes for the different wavelengths and the modulation codes are modified by the insertion of a gap between each bit of the modulation code, the gap having a duration of at least n-1 bits where n is the number of different wavelengths.

20 Claims, 12 Drawing Sheets

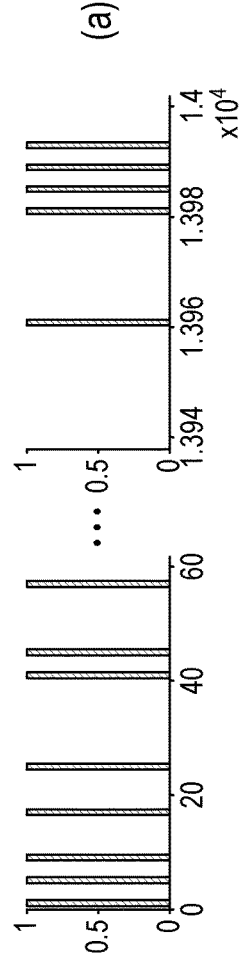
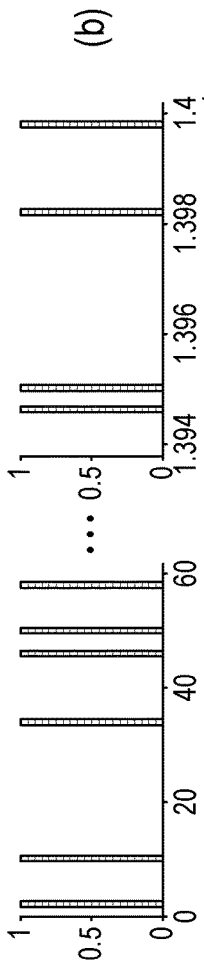
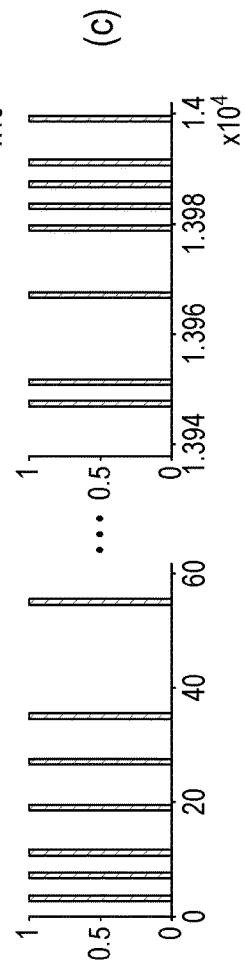
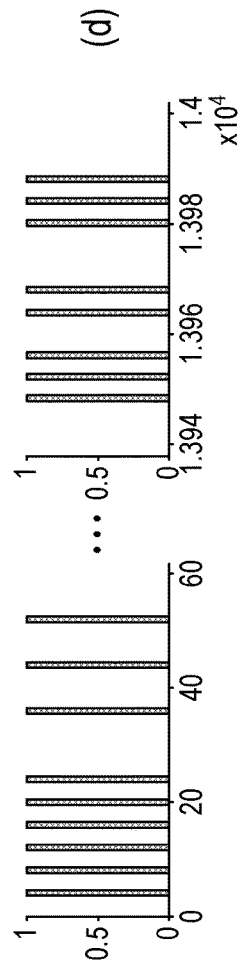
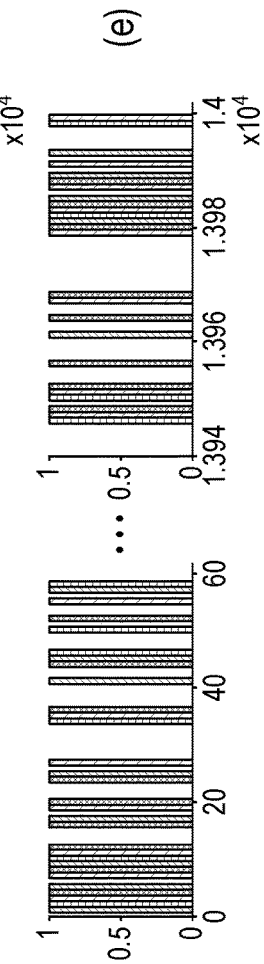
FIG. 4

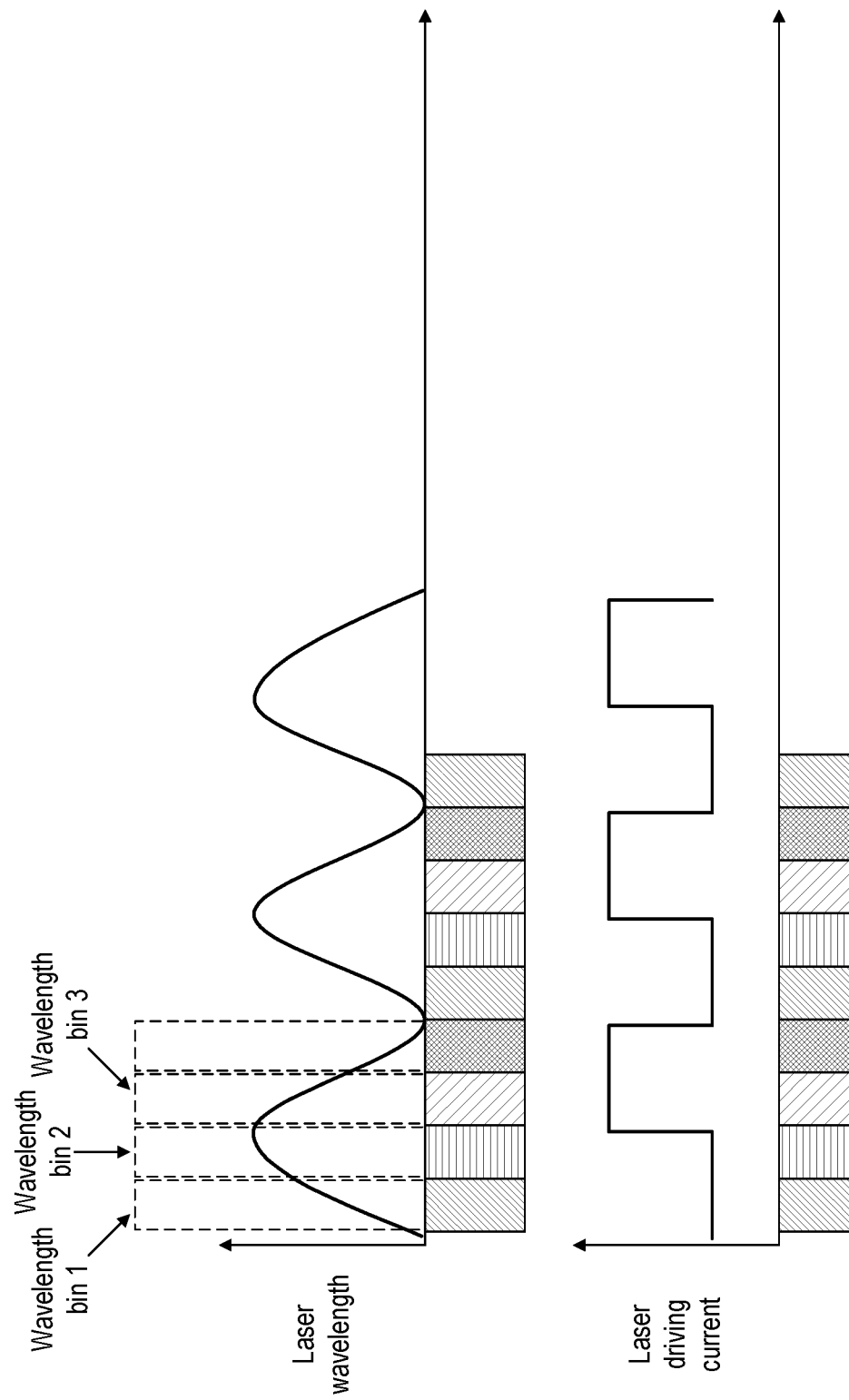

GAS DETECTION TUNING MODULATION

CROSS REFERENCE TO RELATED APPLICATIONS

This application claims the benefit of priority of GB Patent Application No. 2116372.0, filed Nov. 12, 2021, and United States Provisional Patent Application No. 63/202,376, filed Jun. 8, 2021, both of which are incorporated herein by reference in their entireties.

The present invention is in the field of gas detection using optical techniques.

BACKGROUND

It is known to use laser-based optical devices to detect atmospheric gases. Such devices can be used to scan an area to determine the presence of a gas. An example is shown in GB2586075A. A goal with such devices is to achieve fast spatial scanning to achieve imaging.

Some methods and apparatus described in the following are directed at improving the speed of spatial scanning. However the invention is not limited to methods and apparatus which achieve improvements in speed and some embodiments may solve other problems.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

The present disclosure provides a method of gas detection in which radiation of different wavelengths transmitted through the gas is modulated in order to differentiate backscattered transmitted radiation from noise.

In one aspect there is provided in the following a method of gas detection comprising emitting radiation of different wavelengths across the absorption spectrum of a gas towards a target area; and analysing the spectrum of returned laser light from the target area to identify the gas in the target area using the time correlation of the emitted radiation and the returning radiation. Thus, by suitable selection of the range of different wavelengths, a particular gas, if present in the target area or location, can be detected. The radiation is modulated using respective orthogonal modulation codes for the different wavelengths and the modulation codes are modified by the insertion of a gap, also referred to here as a "zero padded code" between each bit of the modulation code. The gap duration, or total duration of zero padding, is at least n–1 bits, where n is the number of different wavelengths. In other words, the consecutive bits of the modulation codes are spaced by a gap or time period having a duration of at least n–1 bits.

For any wavelength, radiation of at least one of the other wavelengths may be transmitted during the gap between bits for that wavelength. Thus, the insertion of gaps, or padding, allows the different codes to be interleaved.

The radiation may comprise visible light. A suitable source is a distributed feedback laser. The radiation may be emitted from one or more laser sources, or a source may be tuned across a range of different frequencies including the different wavelengths in which case the tuning may be synchronised with the respective modulation codes. Thus in some implementations to be described further below, the laser may be driven with a square wave modulation current to modulate the wavelength, and the radiation may further be modulated with the codes.

An existing gas detection device with a suitable computing system, either included in or separate from the device, may be modified to implement any of the methods described here. Thus an implementation may be in the form of a computer readable medium which when implemented in a gas detection system cause the system to implement any of the methods described here.

There is also provided a gas detection system configured to operate according to the method. As will be explained further, the methods described here are particularly suited to single photon detection using a a Tuneable Diode Laser Absorption Spectroscopy (TDLAS) laser device as the source.

BRIEF DESCRIPTION OF THE DRAWINGS

Embodiments of the invention will be described, by way of example, with reference to the following drawings, in which:

FIG. 4 is a series of graphs similar to those shown in FIG. 3 showing the transmitted light signal resulting from the modulation scheme shown in FIG. 3;

FIG. 12 is a diagram showing an example of how light from a tuned laser may be divided into wavebands.

Figure 1:
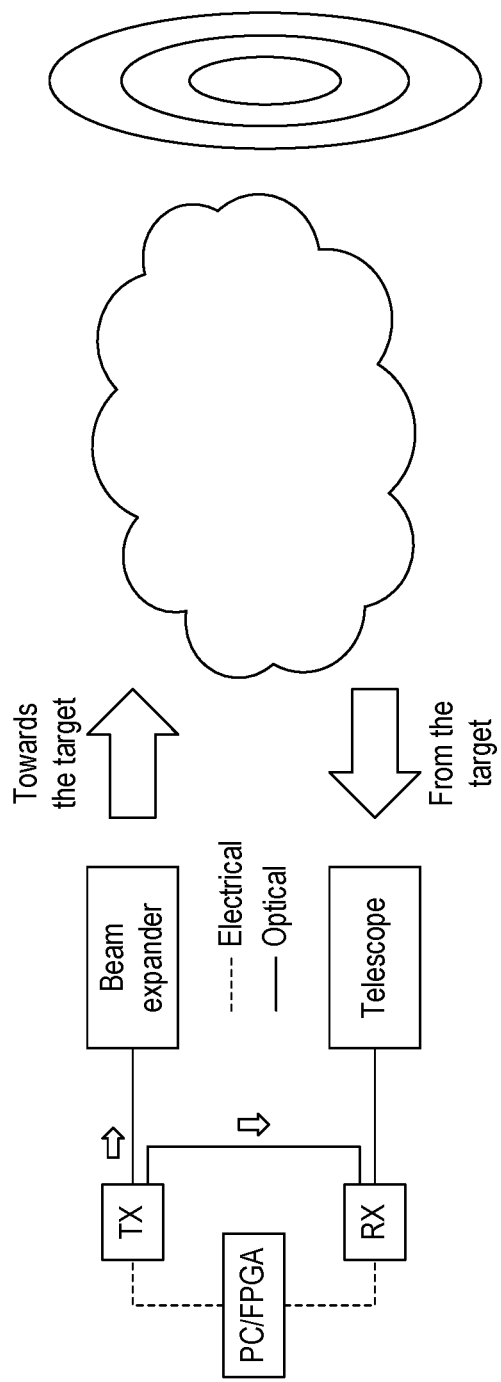
FIG. 1 is a schematic diagram of the basic architecture of a lidar system.

Common reference numerals are used throughout the figures to indicate similar features.

DETAILED DESCRIPTION

High-sensitivity, low-power, remote gas detection and imaging systems are being developed based on novel semiconductor infrared lasers, single-photon detectors and quantum technology. An example application for this technology is the remote detection and quantification of leaks from natural gas wells and pipelines to locate, quantify and map fugitive emissions.

GB2586075A discloses a gas sensor using a combination of two laser technologies known as Single Photon LiDAR and Tuneable Diode Laser Absorption Spectroscopy (TDLAS) designed to provide a fast, accurate leak identification, quantification, and mapping system to meet the commercial needs of oil and gas producers for high-speed sensing and large survey coverage area at a small fraction of the operational costs of their existing solutions. A sensor of this type may use a rapidly tuned (>100 kHz) diode laser using direct current modulation. In other words the frequency at which the gas spectrum is traversed is greater than 100 kHz. The modulation scheme to be described further below does not necessarily require the light wavelength to be tuned since different sources may be used to emit light of different wavelengths. For example, DFB lasers can be set to emit custom wavelengths. So an array of different DFB lasers could be used to generate the range of wavelengths required. Further, where a tuned source is used, no particular tuning frequency is required.

Lidar (Light Detection And Ranging) is the most common denomination for a variety of technologies based on the detection of laser light after propagation and return in free space. Lidars are also called ladars (laser detection and ranging), laser radars, laser range finders and laser telemeters. The large variety of lidar types ranges from low power low cost consumer applications (face identifier in smartphones, sensors for self-driving cars . . . ) to high power and extremely complex space-borne instruments, such as the Atmospheric Laser Doppler Instrument of the European Space Agency in AEOLUS mission.

The basic architecture of a lidar system is depicted in FIG. 1 where TX indicates a laser transmitter, RX an optical receiver, PC: personal computer, FPGA: Field Programmable Gate Array. The laser transmitter (TX) works either in Continuous Wave (CW), pulsed condition, or under modulation, and the beam is launched through a lens system, beam expander or telescope. The reflected signal is detected by the receiver (RX), and electronically processed to derive the distance to the target and other information. Depending on the system, the RX may also use a fraction of the emitted light as reference or as local oscillator to beat against the returned signal on the detector. In other possible implementations a local oscillator is not required. The laser may be a distributed feedback (DFB) laser as is known in the art.

The original lidar distance measurement has been extended to measure many new parameters including the velocity of remote objects, the quantity and type of gas the laser passes through, and the velocity of the air.

Single photon lidar is a very active field with multiple research groups working on long distance measurement. Geiger-mode single-photon lidar systems, originally developed by MIT Lincoln Laboratories have been made commercially available and used for satellite observations of the Earth's surface. For example, Zheng-Ping Li et al, Single Photon imaging over 200 km, Optica Vol. 8, No. 3 p 344 March 2021, present a single photon lidar system that uses "optimized compact coaxial transceiver optics". The transceiver is the optical system that transmits the lidar beam out of the laser source into the environment and then receives the scattered return light back from the environment and directs it into the single photon detector. In some aspects the present invention provides an improved transceiver system. In other aspects the invention provides a gas lidar detection apparatus including the improved transceiver system. The systems may use a modulation scheme described further below that optimises the system for gas spectroscopy.

It should be noted that although light is referred to here, the methods and systems described are not limited to visible light and are applicable to other wavelength radiation.

Figure 2:
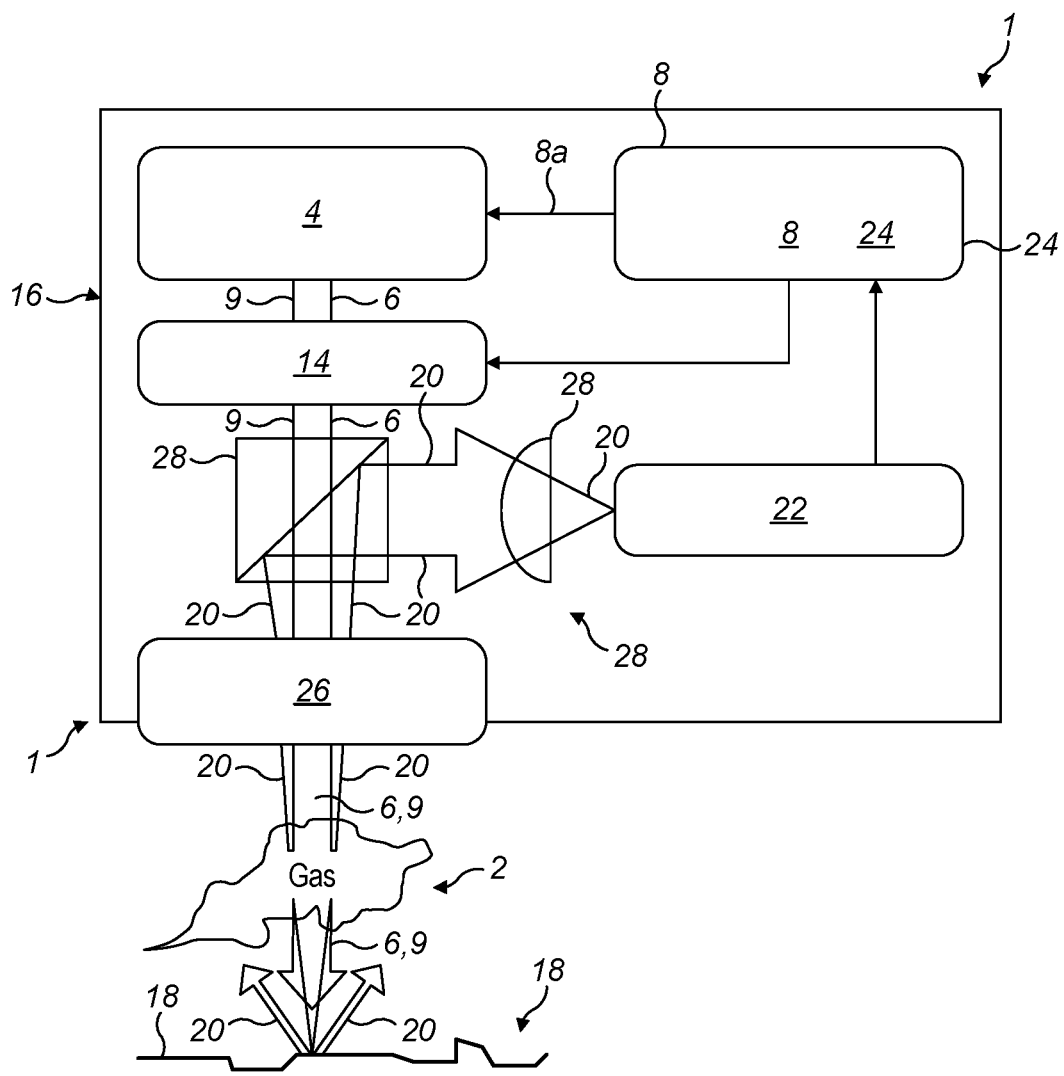
FIG. 2 is a schematic diagram of a single photon lidar system.

FIG. 2 is a schematic diagram of a single photon lidar system, described in further detail in GB2586075A as an optical gas detection device. The gas detection device is configured to detect the presence or concentration of at least one gas 2.

In the system of FIG. 2, a laser device 4 is operable to output first output radiation 6 having a continuous wave output. A control element 8 is operable to tune a first emission wavelength 9 of the first output radiation 6 continuously within a first wavelength spectrum 10 to allow for fast scanning of an environment whilst reducing the spectral coherence of the transmitted radiation of the optical device 1. The laser device may comprise a TDLAS device.

As shown, the device 1 includes a modulator 14 operable to apply a first output modulation 16 to the first output radiation 6. Further, the device 1 includes an optical transceiver system 26 operable to transmit the first output radiation 6 towards a first target location or areal 8 and to collect/receive scattered radiation 20, the scattered radiation 20 having been at least partially modified by the gas 2 present in the first target location 18. A detector 22 is configured to receive the scattered radiation 20 and a processing element 24 is operable to process the received scattered radiation 20. The detector 22 may comprise a single photon lidar sensor as is known in the art.

The control element 8 and the processing element 24 may be comprised in a computer or computing system which may be part of the device 1. The processing element may comprise a FPGA as mentioned in connection with FIG. 1. Alternatively components of the device shown in FIG. 1 may be controlled from a computer or computing system remote from the device itself.

In the systems and methods described in the following, coded laser pulses of slightly different wavelengths across the gas absorption spectrum are emitted from a laser towards a target area. The resulting laser beam may be transmitted through a gas plume in the target area and backscattered by the diffusive gas. The spectral absorption may then be measured to identify the gas and/or to obtain the gas concentration. The distance to the gas may be calculated by the time-of-flight of the pulses. In the following it is assumed that the laser pulses of different wavelength are obtained by tuning source across the spectrum. However the same result can be achieved using a set of sources of laser light operating at the different wavelengths.

The measurement of spectral absorption may comprise analysing the spectrum of returned laser light from the target area using the time correlation of the emitted radiation and the returning laser light. For this purpose the emitted radiation of different wavelengths may be modulated using a code. One reason for the modulation is to distinguish received light that originated from the laser transmission from light arriving at a system detector from other sources, e.g. noise. This is particularly important when the signal to noise ratio is very small, which is the case with single photon detection.

An example of a modulation scheme will now be described with reference to FIGS. 3 to 12.

FIG. 3(a) to (d) shows, on the left, different modulation codes to be applied to light of different wavelengths. In practice each "wavelength" may be a band within a continuous spectrum rather than a single wavelength. Four wavelengths are shown for simplicity but in a practical implementation the wavelength spectrum will typically be divided into 32 or more different wavelengths or wavebands. The different codes on the left are referred to as "raw" codes in which the bits of the code are consecutive. In a modulation scheme each bit will typically occupy a period of time. The raw code is represented as 1 or −1, where light is transmitted during the 1 periods and not transmitted during the −1 periods. The bit period or duration may be determined by a signal processor used to analyse the returned laser light, e.g. the FPGA.

As illustrated different codes are applied to light of different wavelengths. In the example shown in the figures, the codes are binary codes. In general any long sequence of random 1 and −1 will constitute a usable code. However it will be appreciated that performance can be improved by picking a set of codes with lower cross correlation between one another. Therefore the codes may be orthogonal codes. Each code may be for example a deterministic pseudo-random binary sequence (PRBS). In another example the different codes may be ones of a set of cyclic codes in which each code is a shifted version of the other codes in the set. Other examples of suitable codes will be known to those skilled in the art.

In the illustrated modulation scheme, for each wavelength, rather than the bit periods of the codes being consecutive, a gap is inserted between each bit of the code during which no light of that wavelength is transmitted. The duration of the gap is at least n−1 bit periods where n is the number of different wavelengths, or in other words n is the number of wavebands into which the spectrum is divided. This is referred to in the figures as "padding" the codes. Thus in FIG. 3 on the left side for each wavelength (a) to (d) a raw code and a "zero padded code" is shown. A larger gap than n−1 bit periods may be used if required. In the illustrated examples the gap between consecutive bits is the same. To put this another way, each code is "padded" in time such that a bit from that code is only applied when the laser is emitting the wavelength assigned to that code. Moreover, in contrast to known modulation schemes, the bits of each code are applied one at a time. Thus for example consecutive "transmit" bits will be separated as a result of the padding.

Figure 3:
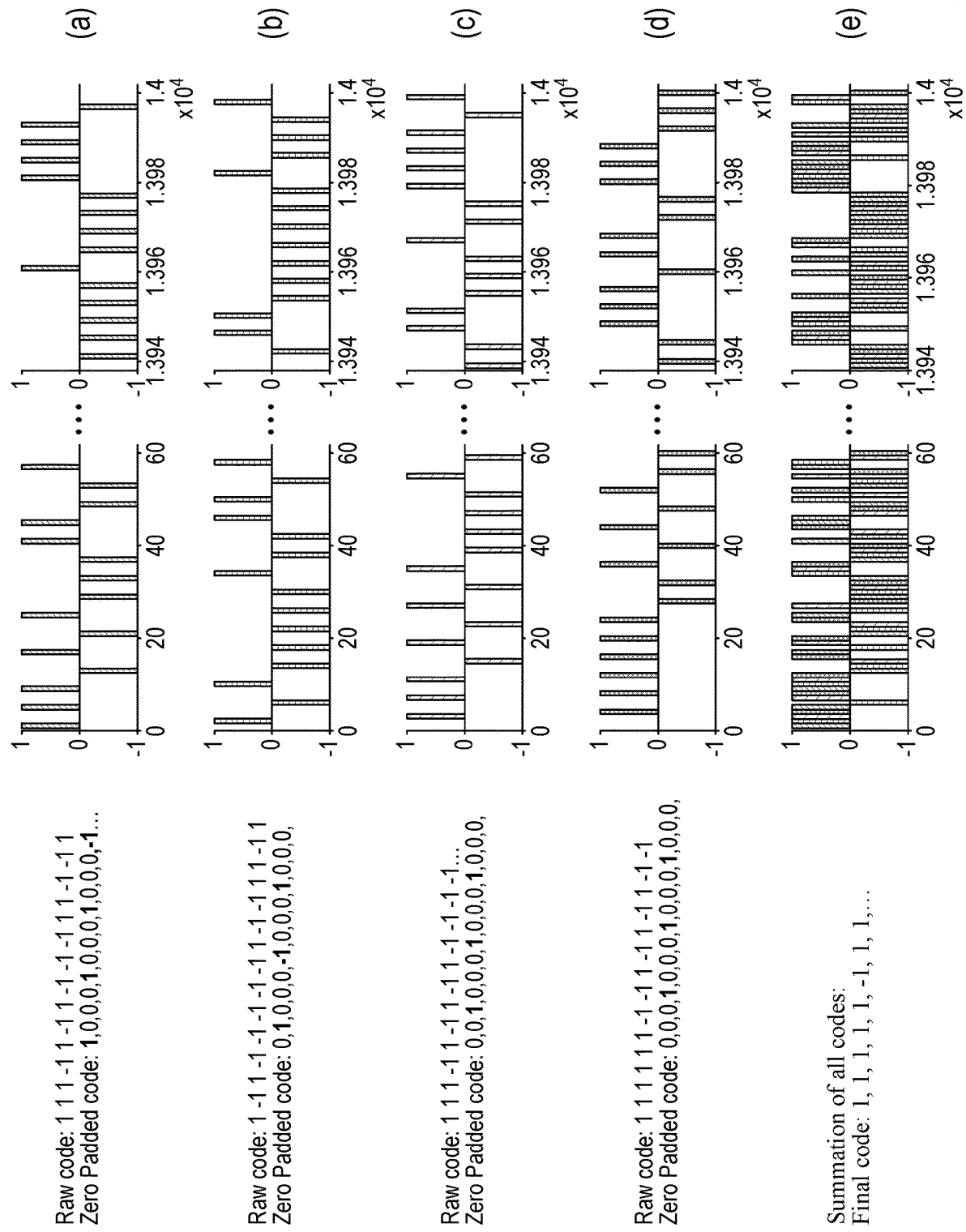
FIG. 3 shows different modulation codes to be applied to light of different wavelengths in binary and graphical form.

Only the first portion of each zero padded code is shown on the left of FIG. 3. On the right the beginnings and endings of the zero padded codes are shown in graph form. Here it will be noted that each next wavelength (b), (c), (d) is delayed by one bit period so that when the codes are summed as shown in FIG. 3(e), the gaps in each code are filled by bits of code applied to a different wavelength. Thus it will be seen that the padding allows the different codes to be interleaved.

It can be seen that in the example of FIG. 3, during the transmission time of one code for one wavelength, light of any one or more of the other wavelengths is transmitted. This is enabled by the gaps between code bits. For maximum benefit, where there are n different wavelengths, light of all the other n−1 wavelengths is transmitted during the duration of a code for one wavelength. However a significant benefit can be achieved even if not all wavelengths are interleaved during one code duration.

If a tuned source is used as the source of the radiation, the wavelength may be tuned in sync with the codes. So in the illustrated example where 4 different codes are used for 4 different wavelengths respectively the laser wavelength tuning period may be equal to 4*<code length>*<bit time>. More simply put, each vertical line in FIGS. 3 and 4 for example may represent a distinct time window in a tuning period, for example the time taken to vary the wavelength across all four wavebands.

The figures show a very simple example of a code. A practical code may have of the order of 4,500 or $2^{13}$ bits and may be repeated. During the "padding" time of one code for one wavelength, light of any of the other n−1 wavelengths is transmitted. In the illustrated example, during the duration of the code for one wavelength light of all the other n−1 wavelengths is transmitted.

Laser light is transmitted only when the corresponding code bit is positive and so there may be periods of no light transmission larger than the gaps of n−1 bit periods. For example the code (b) contains a period equivalent to 7 bit periods where there is no light transmission. In this example the period of the gap is 3 bit periods.

As shown in FIG. 3, the wavelengths are emitted cyclically. For example wavelength x is emitted once during each period of the laser tuning, which may be for example ~1 us. Every time wavelength x is emitted from the laser the next bit of the code_x is applied to the laser. Similarly every time wavelength y is emitted from the laser one bit of code_y is applied to that laser pulse.

Therefore the result is a laser beam where code_x bits are applied only to wavelength x, and code_y are applied only to wavelength y (as in FIG. 3e). The 'padding' in the code_x is the time spent waiting the laser to emit the wavelength x again so the next code_x bit can be applied. The padding ensures each code is applied to one, and only one, wavelength. Referring back to FIG. 2, the modulation scheme described here may be implemented by suitable control of the modulator, for example by the control element 8.

The combination of padding and interleaving the codes allows scanning of the wavelength spectrum more quickly since without it each waveband would need to be transmitted for a period corresponding to the length of the code, assuming the same bit period. This may also allow faster results because the whole code length is not required before analysis of the returned radiation can commence.

FIG. 4 is a series of graphs similar to those shown in FIG. 3 showing the transmitted light signal resulting from the modulation scheme shown in FIG. 3. FIG. 4(e) shows that when the codes are summed in practice there are gaps in transmission as a result of the coding applied to the different wavelengths.

Figure 5:
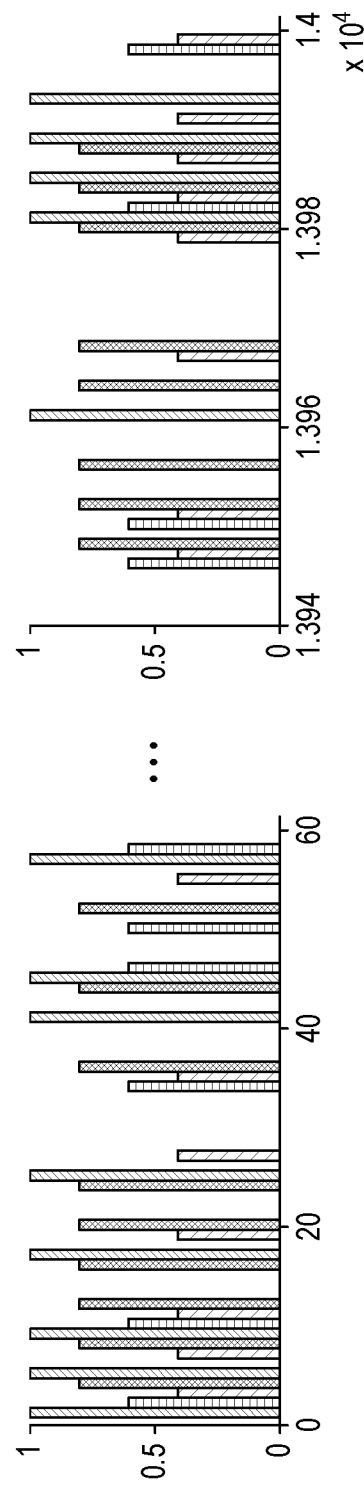
FIG. 5 shows an example of a signal received at a detector.

In the example of FIG. 4 the different wavelengths are transmitted at the same intensity. The transmitted light is then scattered back and received, for example at a detector in a lidar system. Light of different wavelengths will be scattered back at different intensities depending on the gas present in the path of the transmitted light. FIG. 5 shows an example of a signal received at a detector where it can be seen that light of wavelength (a) is scattered back with the highest intensity and (c) with the lowest intensity.

In practice the received signal will be largely masked with noise and therefore the codes may be used to differentiate noise from backscattering that originated at the transmission source, in any manner known in the art. In general this differentiation uses the time correlation of the emitted radiation and the returning light, which may be examined using a convolution or correlation technique. This is illustrated in FIG. 6.

Figure 6:
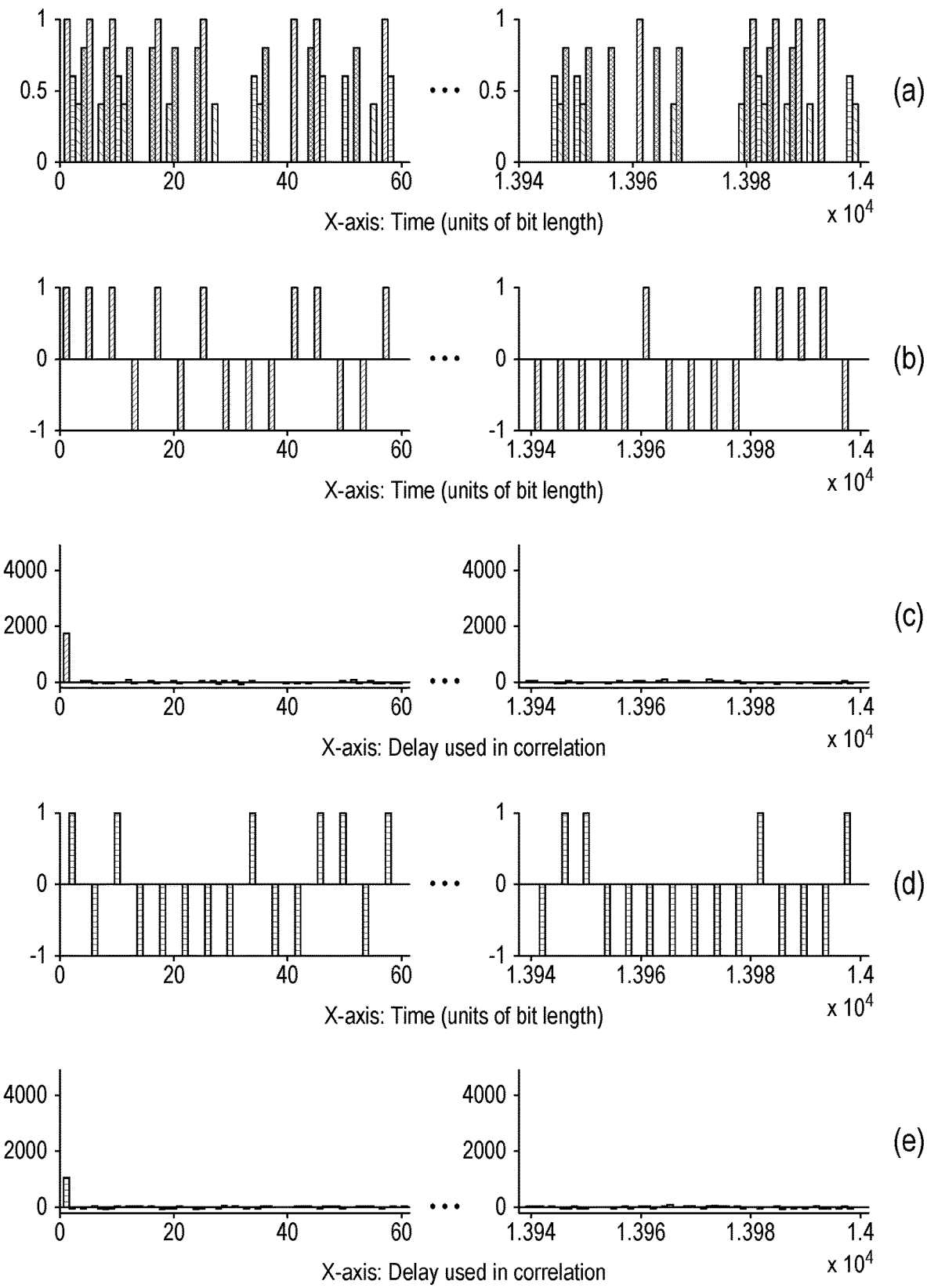
FIG. 6 is a set of graphs illustrating the time correlation of the emitted radiation and the returning light.

In FIG. 6, (a) shows the received signal and (b) shows the code used for the wavelength transmitted first in this example. Convolution of the received signal with the code for the first-transmitted wavelength will produce nonzero value at a single offset of the convolution shown in (c). Similarly, convolution of the received signal with the third of the codes will produce (e). The amplitude of (c) and (e) give the amplitudes of the two wavelengths in the received signal. Here it can be seen that the correlation operation is between the (1,0) version of the codes which are physically encoded in the light signal and the (1,−1) version of the code, for example stored in the computer/FPGA. The use of the (1,−1) version of the codes is used because it causes non correlated bits to cancel out (on average) since they have a 50% chance of being multiplied by 1 or −1. In contrast correlated 1's bits from the signal will always be multiplied by 1's in the correlation calculation, and correlated 0's in the signal will always be multiplied by −1. In the particular example shown, correlation is performed as an operation on two vectors in which one is shifted by a delay (x) and taking the inner product with the other vector. Thus the x-axis of c) and e) is this delay (x) in the correlation.

Figure 7:
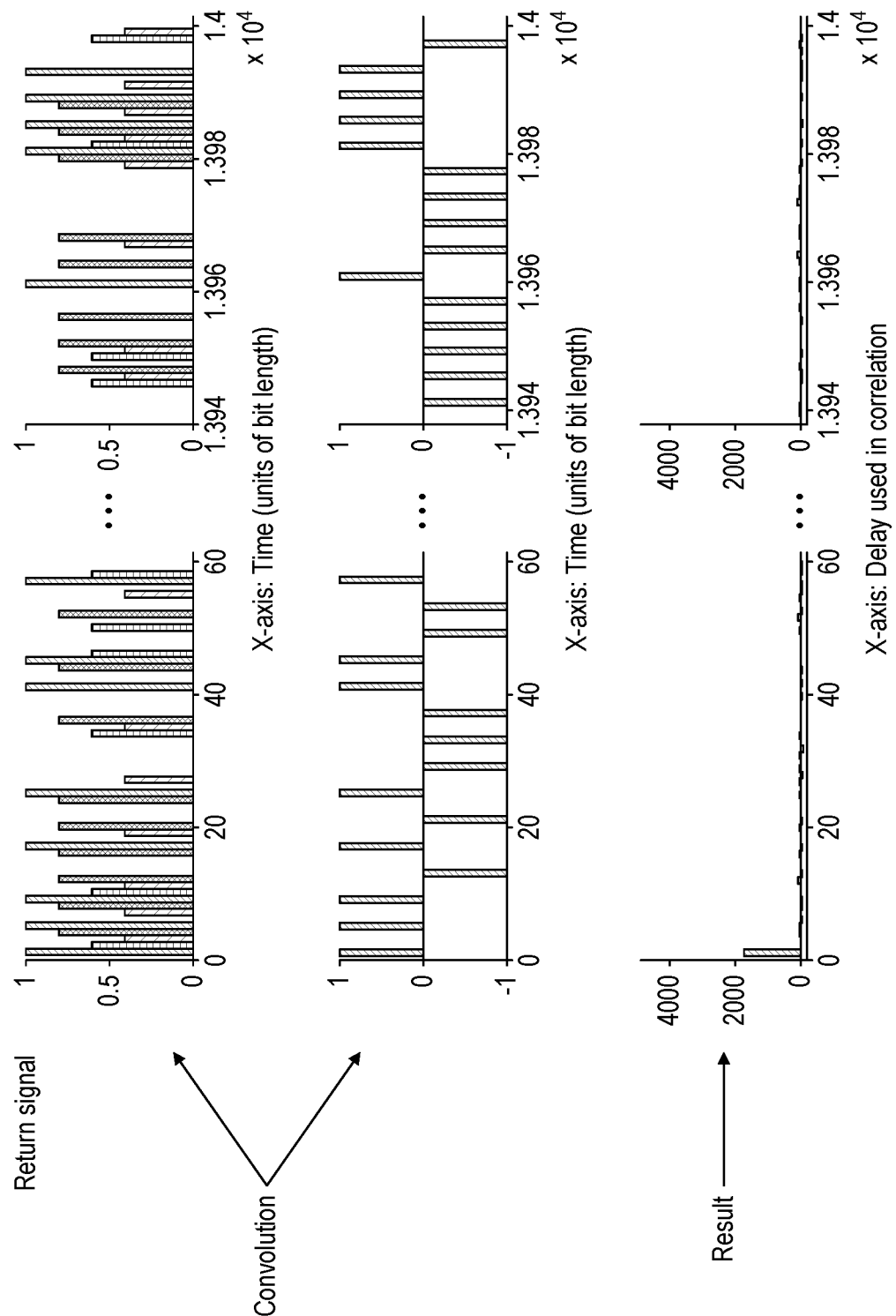
FIG. 7 shows some of the graphs of FIG. 6 enlarged.
Figure 8:
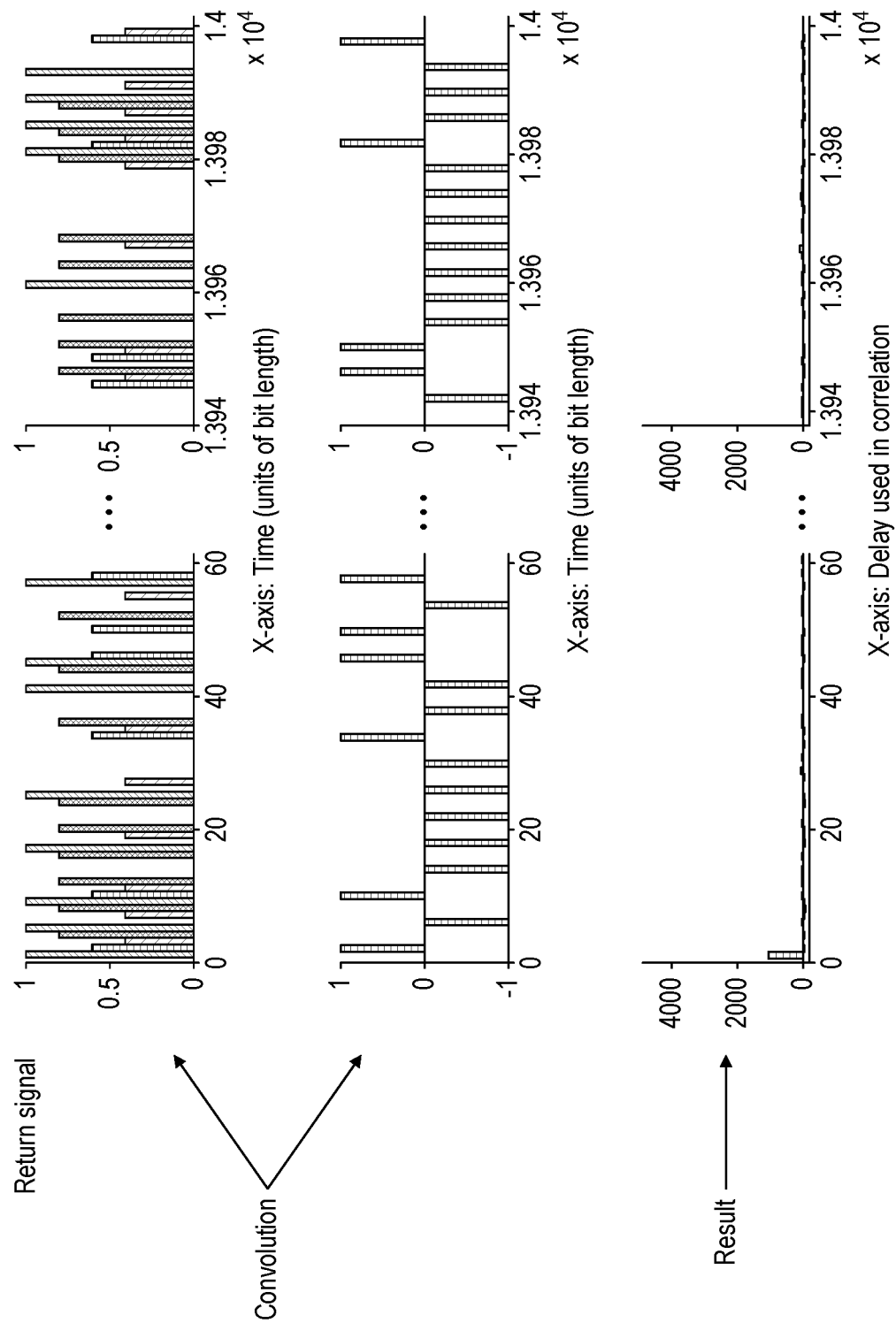
FIGS. 8, 9 and 10 show graphs similar to FIG. 7 for the other illustrated wavelengths.
Figure 9:
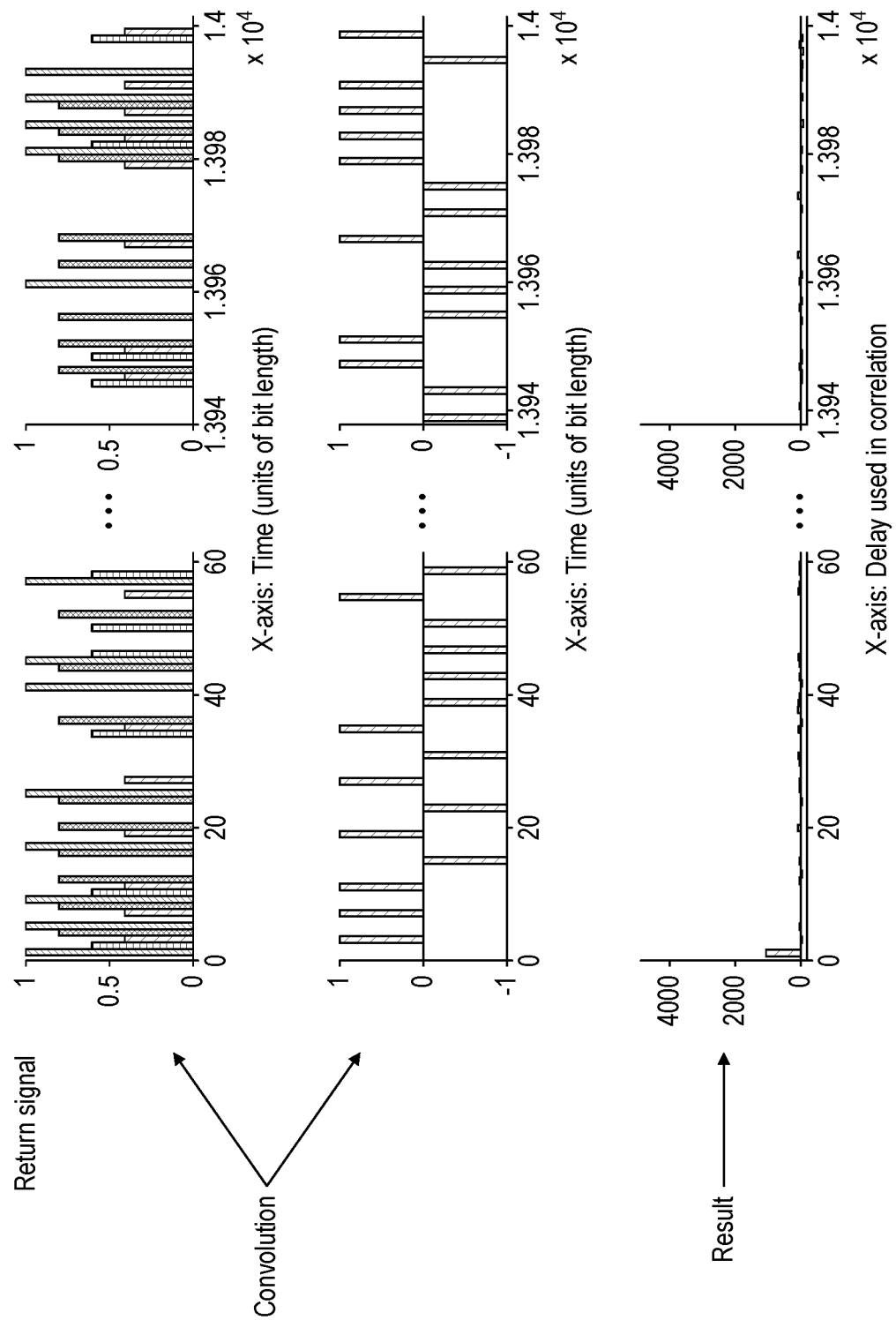

It should be noted that for the purpose of the time correlation the "padded" code should be used rather than the raw code. FIG. 7 shows some of the graphs of FIG. 6 enlarged to illustrate this point and FIGS. 8, 9 and 10 show graphs similar to FIG. 7 for the other illustrated wavelengths.

Figure 10:
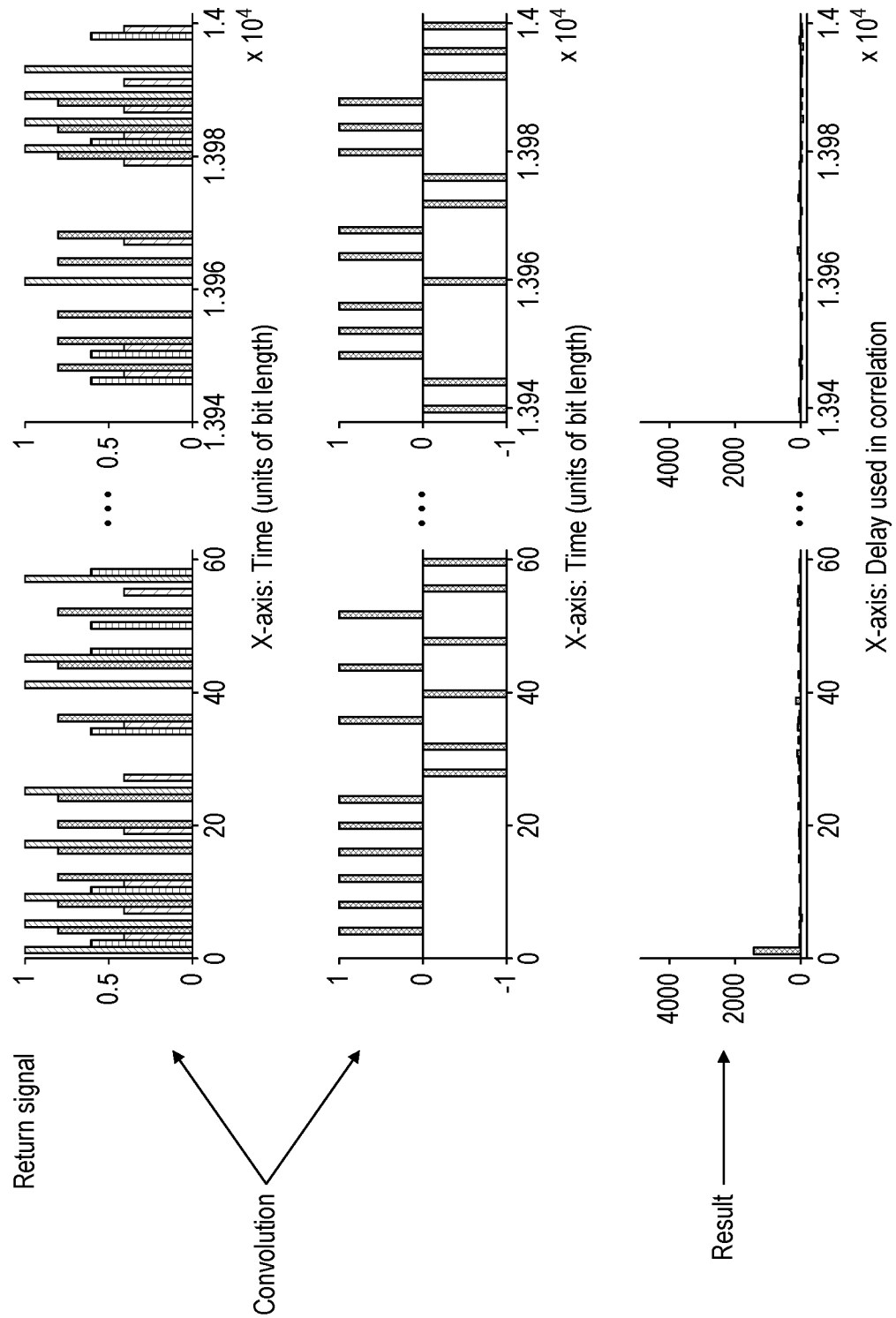
Figure 11:
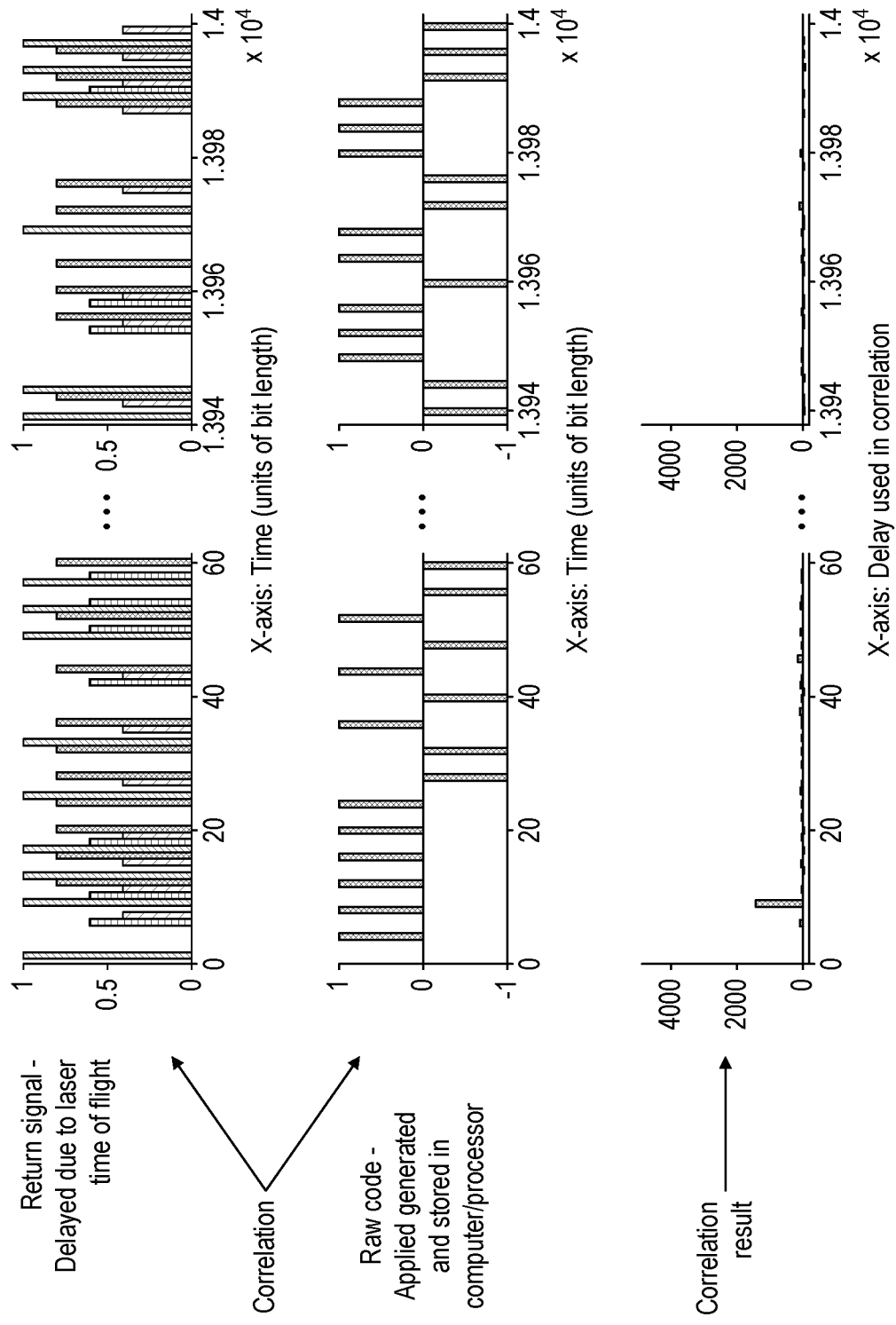
FIG. 11 shows a set of graphs similar to those shown in FIG. 10, modified to show how the correlator output would change if the signal was delayed in time.

FIG. 11 is a set of graphs similar to those shown in FIG. 10, modified to show how the correlator output would change if the signal was delayed in time, i.e. if the light travels further through the environment before being scattered back to the detector. Comparing the correlation results shown in FIGS. 10 and 11 it can be seen that the peaks are shifted to the right along the x-axis in FIG. 11 due to the larger time of flight. This information can be used in determining the location of a gas, as is known in the art.

The coding scheme described in the foregoing may be implemented in an existing detection system. A computer readable medium may be provided, in transitory or non-transitory form which when implemented in a gas detection system causes the system to implement any of the methods described here.

In the foregoing it has been assumed that the different codes (a) to (d) used in FIG. 3 are applied to radiation of different wavelengths, or in different wavebands or wavelength "bins". In a practical implementation the wavelength may be varied upwards and then downwards in one tuning cycle, or laser drive current cycle. Then, the different modulation codes may be applied to different stages in a tuning cycle, or driving current cycle. This is illustrated in FIG. 12 for an example where the tuning cycle is divided into four bins. In a practical implementation 32 or more bins may be used. It can be seen in FIG. 12 that wavelength bins 2 and 3 represent similar wavelengths. They may nevertheless be assigned different codes. It may be that the only difference between two bins is the direction in which the wavelength is changing. Notably even in the example of FIG. 12 there are two different wavebands to which different modulation codes are applied.

In principle, the same code could be used for similar wavelengths, but the division of the wavelength channels based on the position in the laser drive current cycle rather than the wavelength is simpler since the drive current is known and can be more readily controlled.

As already noted, some implementations of the methods described here may be faster because it is possible to scan through the entire wavelength range faster. The ability to scan the laser wavelength fast has other advantages.

Low frequency noise is reduced as a result of fast scanning. Laser output power tends to fluctuate over time. These fluctuations are greater on longer time scales. Thus by scanning the laser wavelength very fast it is possible to reduce the impact of these fluctuations on the spectroscopy result.

The use of padded modulation codes as described here lends itself particularly to certain kinds of gas detection apparatus, such as a single photon lidar system. It enables a simple and robust laser driving setup: in some kinds of apparatus the method used to sweep the laser wavelength can only produce very fast sweeps, as explained further below.

In a lidar system such as the single photon lidar system shown in FIG. 2, in order to emit the radiation of different wavelengths the laser wavelength is swept by applying a square wave driving current to the laser (typically over a period of ~1 microsecond). Wavelength tuning happens due to the laser gain medium alternating between two different thermal equilibriums states, corresponding to the high and low current states. During the transition between the two states the laser output wavelength sweeps across the range.

This tuning method is very simple and reproducible. However, the time of the sweep is determined by the thermal relaxation time of the laser gain medium (not the driving current frequency). Since the time the laser gain medium takes to reach thermal equilibrium is typically on the order of ~1 us this tuning method could not work on significantly longer time scales. It is effectively limited by the thermal constants of the laser gain medium.

It will be appreciated that in some implementations the modulation scheme described here may be applied to an existing gas detection device with no required modification of the hardware. Therefore the methods described here may be put into practice by a computer readable medium such as a software download or other format described below. Alternatively a suitably programmed computer or computing system may be provided. Such a system or device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

It will be appreciated that a computing device as described here may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

A number of optional features are described in the dependent claims. Any one or more of the features of the dependent claims may be included in a method or system in any combination.

The invention claimed is:

1. A method of gas detection comprising:
emitting radiation of different wavelengths across an absorption spectrum of a gas towards a target area; and
analysing the spectrum of returned laser light from the target area to identify the gas in the target area using a time correlation of emitted radiation and returning radiation;
wherein the emitted radiation is modulated using respective modulation codes for the different wavelengths and the modulation codes are modified by an insertion of a gap between each bit of the modulation code, the gap having a duration of at least n−1 bits where n is the number of different wavelengths.

2. The method of claim 1 wherein for each wavelength, radiation of at least one other of the different wavelengths is transmitted during the gap between bits.

3. The method of 2 wherein the emitted radiation is transmitted consecutively with radiation of each next wavelength being delayed by one bit period with respect to the previous wavelength.

4. The method of claim 1 wherein during a transmission time of one code for one wavelength, light of any one or more of other n−1 wavelengths is also transmitted.

5. The method of claim 1 wherein during a duration of a code for one wavelength light of all other n−1 wavelengths is transmitted.

6. The method of claim 1 wherein the emitted radiation comprises visible light.

7. The method of claim 1 wherein the emitted radiation is emitted from a distributed feedback laser.

8. The method of claim 1 wherein the emitted radiation is emitted from one or more laser sources.

9. The method of claim 1 wherein the emission of radiation of different wavelengths comprises tuning a source of radiation across a range of frequencies including the different wavelengths.

10. The method of claim 9 wherein the tuning is synchronised with the respective modulation codes.

11. The method of claim 9 wherein the range of frequencies is divided into different wavelengths based on a position in a laser drive current cycle.

12. The method of claim 1 comprising driving a source of the emitted radiation with a drive current, applying a square wave modulation to the drive current, and further modulating the emitted radiation with the modulation code.

13. The method of claim 1 wherein the different wavelengths comprise 32 wavelengths.

14. The method of claim 1 wherein the modulation code for different wavelengths comprises a cyclically delayed version of the same code.

15. The method of claim 1 wherein the modulation codes comprise pseudorandom codes.

16. The method of claim 1 wherein the codes comprise orthogonal codes.

17. A non-transitory computer readable medium comprising instructions which, when implemented in a laser gas detection system cause the system to: emit radiation of different wavelengths across an absorption spectrum of a gas towards a target area; and analyse the spectrum of returned laser light from the target area to identify the gas in the target area using a time correlation of emitted radiation and returning radiation; wherein the emitted radiation is modulated using respective modulation codes for the different wavelengths and the modulation codes are modified by an insertion of a gap between each bit of the modulation code, the gap having a duration of at least n−1 bits where n is the number of different wavelengths.

18. A gas detection system configured to implement a method of gas detection comprising:
emitting radiation of different wavelengths across an absorption spectrum of a gas towards a target area; and
analysing the spectrum of returned laser light from the target area to identify the gas in the target area using a time correlation of emitted radiation and returning radiation;
wherein the emitted radiation is modulated using respective modulation codes for the different wavelengths and the modulation codes are modified by an insertion of a gap between each bit of the modulation code, the gap having a duration of at least n−1 bits where n is the number of different wavelengths.

19. The gas detection system of claim 18 comprising a Tuneable Diode Laser Absorption Spectroscopy (TDLAS) laser device configured to emit the emitted radiation.

20. The gas detection system of claim 18 comprising a detector arranged to detect the returned laser light, the detector comprising a single photon lidar sensor.

* * * * *